United States Patent [19]

Endoh et al.

[11] 4,138,059

[45] Feb. 6, 1979

[54] CARD HANDLING DEVICE

[75] Inventors: Takeshi Endoh, Tama; Mitsuru Takayasu, Kawasaki, both of Japan

[73] Assignee: Fujitsu Limited, Japan

[21] Appl. No.: 639,217

[22] Filed: Dec. 10, 1975

[30] Foreign Application Priority Data

Dec. 13, 1974 [JP] Japan .................................. 49-143955

[51] Int. Cl.$^2$ ...................... G06K 13/06; E05B 65/00; G07F 1/06; G06K 13/08
[52] U.S. Cl. ........................................ 235/483; 49/35; 194/4 G; 235/480
[58] Field of Search ............... 271/238, 259, 262, 263; 235/61.11 R, 61.11 D, 480, 483, 482, 485; 360/2, 4; 194/4 G, 97 R, DIG. 6; 49/35

[56] References Cited

U.S. PATENT DOCUMENTS

| 3,624,360 | 11/1971 | Collier ........................... 235/61.11 R |
| 3,745,919 | 7/1963 | Wattenburg ................... 235/61.11 R |
| 3,766,687 | 10/1973 | Henson ..................................... 49/35 |
| 3,787,661 | 1/1974 | Moorman ...................... 235/61.11 D |

*Primary Examiner*—Robert M. Kilgore
*Attorney, Agent, or Firm*—Staas & Halsey

[57] ABSTRACT

A card handling device, which includes a card inserting aperture for inserting a card therethrough, a card reader for reading information data from an inserted card and means for carrying the card from the inserting aperture to the reader, in which there is provided a detector for detecting a deformed or curved card disposed at a position between the card inserting aperture and the card reader, whereby the deformed card is fed back through the card inserting aperture while a non-deformed card is fed to said card reader by the card carrying means.

8 Claims, 3 Drawing Figures

CARD HANDLING DEVICE

BACKGROUND OF THE INVENTION

1. Field of the Invention

The present invention relates to a card handling device for reading information data inscribed on a card which is received from a card inserted aperture, especially relates to a card handling device in which a deformed or curved card is immediately fed back to a card inserting aperture without reading said information or data.

2. Description of the Prior Art

In an Automatic Teller Machine, for example, where a cash dispenser is utilized to perform a banking function, a magnetic code bearing card is utilized for the purposes of identifying a customer and automatically recording transaction data. Accordingly, a card handling device is provided for the purpose of processing the magnetic card. In this card handling device, the magnetic code bearing card of the customer, inserted through a card inserting aperture, is read by a magnetic reading head, and the characters or letters embossed on magnetic card are imprinted on a receipt. After the transaction, the receipt and the magnetic card are then fed back to the customer.

In the above-mentioned card handling device, if the magnetic card is deformed or bent in a curved condition, a correct reading cannot be performed by the magnetic reading head. This is because the magnetic head may be broken by excessive pressure applied by the magnetic card while it is in the reader. Furthermore, the card handling device does not operate in a normal condition due to the card being caught in the device and, as a result, an accurate imprint can not be carried out.

SUMMARY OF THE INVENTION

The principal object of the present invention is to provide a card handling device, wherein a deformed card is fed back to a card inserting aperture upon the detection of the deformation.

The above-mentioned object of the present invention can be performed by a card handling device which includes a card inserting aperture for inserting a card therethrough, a reader for reading information data inscribed on the card being inserted and a means for transporting the inserted card from the card inserting aperture to the card reader. According to the present invention, the card handling device includes a detector for detecting and effecting rejection of a deformed card disposed at a position between the card inserting aperture and the card reader. The detector generates an output signal when the deformed card is detected, and a means for controlling the transporting means responds to the output signal so as to feed back the deformed card to the card inserting aperture.

BRIEF DESCRIPTION OF THE DRAWINGS

Further features and advantages of the present invention will be apparent from the ensuing description with reference to the accompanying drawings to which, however, the scope of the invention is in no way limited.

DESCRIPTION OF THE PREFERRED EMBODIMENT

Figure 1:
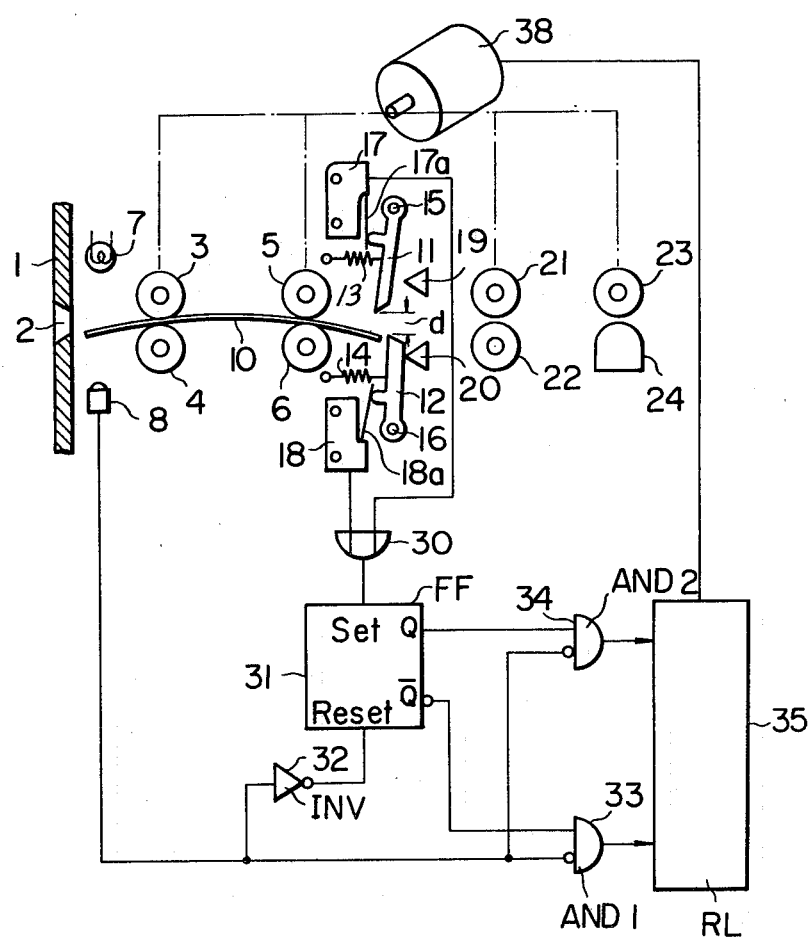
FIG. 1 is a block diagram showing an embodiment of a card handling device, according to the present invention.

Referring to FIG. 1, in the device according to the present invention, a vertical front plate 1 of a card reader is provided with a card inserting aperture 2 formed at its central portion. Two pairs of upper and lower, driving and follower rollers 3–4 and 5–6 respectively, are disposed in the device with a distance between them which is shorter than the length of a card. A light source 7 and a light receiving element 8 are disposed in a space between the card insertion aperture 2 and the pair of rollers 3 and 4, to detect insertion of a magnetic card 10 when it is inserted through the aperture 2 toward the rollers 3 and 4. A pair of upper and lower detecting levers 11 and 12 are disposed at positions downstream of the pair of rollers 5 and 6 with a predetermined distance "d" therebetween. This distance d corresponds to an allowable amount of deformation (bending) of an inserted card. The detecting levers 11 and 12 are respectively mounted for limited movement around horizontal shafts 15 and 16 and connected to tension springs 13. Levers 11 and 12 are also respectively 14. A pair of microswitches 17 and 18 are disposed at positions adjacent to the detecting levers 11 and 12; and these levers 11 and 12 are coupled to contacts 17a and 18a of the microswitches 17 and 18, respectively. Consequently, the microswitches 17 and 18 are actuated by movement of the detecting levers 11 and 12, respectively. The swing motions of the detecting levers 11 and 12 are restricted by upper and lower stoppers 19 and 20, respectively.

It is also envisioned that instead of utilizing microswitches, a light source and light receiving element combination may be utilized so that a light is interrupted when either of the detecting levers 11 and 12 are actuated by the insertion of a deformed card. A pair of upper and lower driving and follower rollers 21 and 22, along with a driving roller 23 and a magnetic head 24 are arranged at a position downstream of the detecting levers 11 and 12 along the feeding direction of the card.

Figure 2:
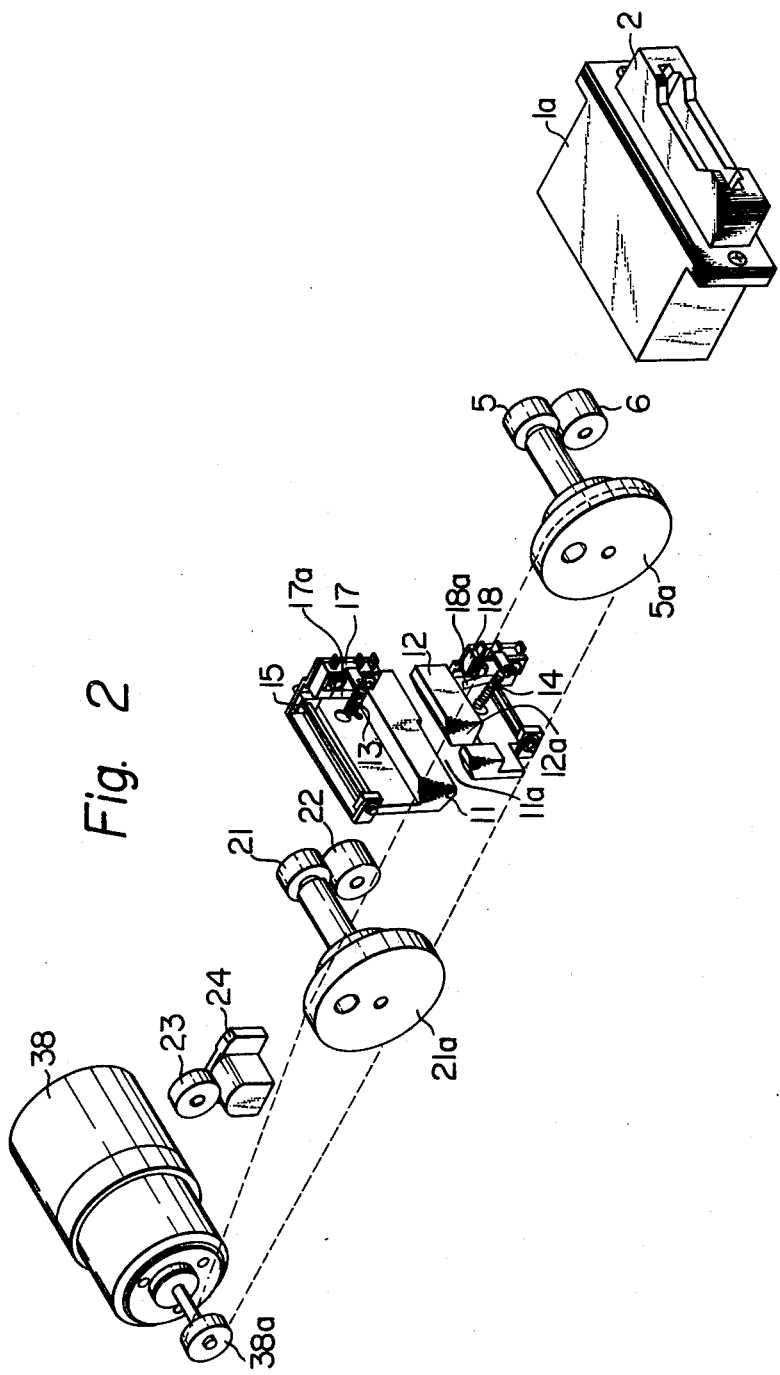
FIG. 2 is a perspective view showing a portion of essential mechanism of the block diagram shown in FIG. 1.

Driving rollers 3, 5, 21 and 23 are respectively driven by a motor 38 via pulleys 3a 5a, 21a (23a) and 38a as shown in FIG. 2 where pulleys 3a and 23a are not shown.

Referring to FIG. 2, the light source 7, the light receiving element 8 and rollers 3 and 4 are included in a block 1a. A gap 12a in the lever 12 is provided for passing therethrough a driving belt for pulley 5a and a depression surface 11a on the lever 11 is provide for passing therethrough the embossed part on the card 10.

Referring again to FIG. 1, the output signals of the microswitches 17 and 18 are respectively connected to a set input terminal of a flip-flop circuit 31 via an OR circuit 30. The output signal of the light receiving element 8 is connected to a reset input terminal of the flip-flop circuit 31 via an inverter 32 and, also, to inverting input terminals of AND circuits 33 and 34. Outputs Q and $\bar{Q}$ of the flip-flop circuit 31 are connected to the other input terminals of the AND circuits 34 and 33, respectively. The outputs of the AND circuits 33 and 34 are connected to a relay circuit 35.

Figure 3:
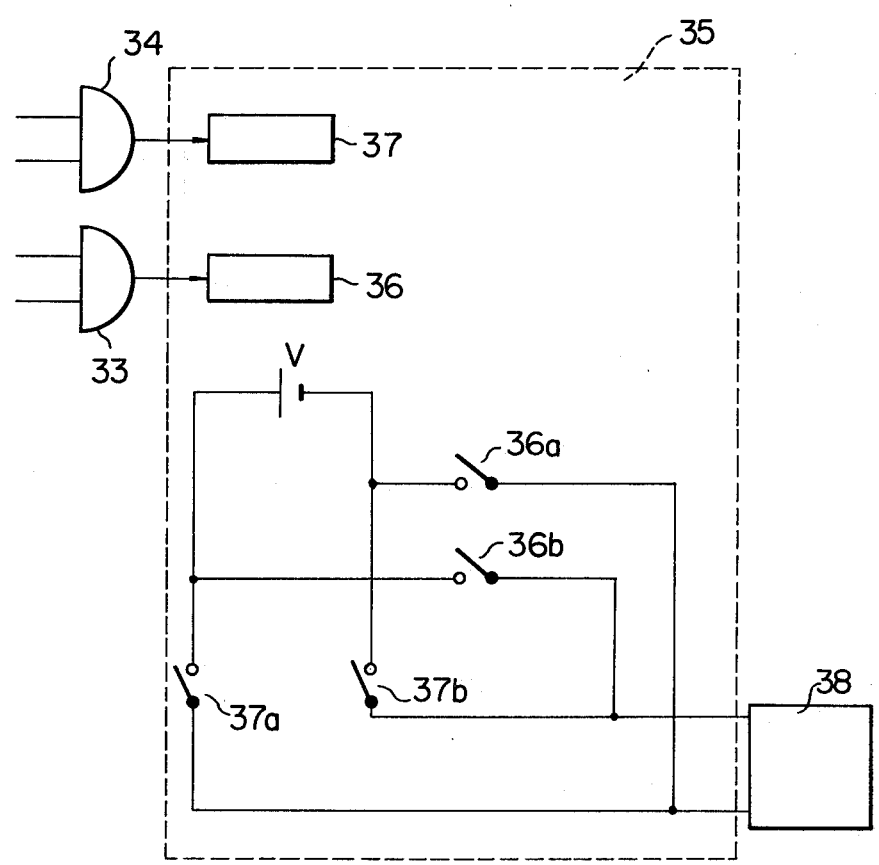
FIG. 3 is a circuit diagram of a relay switching circuit of the block diagram shown in FIG. 1.

The relay circuit 35 is constructed as shown in FIG. 3. That is, the outputs of the AND circuits 33 and 34 are connected to relays 36 and 37, respectively. The relay circuits 36 and 37 are provided with relay contact points 36a, 36b and 37a, 37b, respectively, and these contact points are connected between a DC source V and a motor 38, as shown in FIG. 3.

Next, the operation of the device according to the present invention, as shown in FIGS. 1, 2 and 3, is discussed.

When a magnetic card 10 is inserted into the card inserting aperture 2, the insertion of the magnetic card 10 is detected by the light receiving element 8, and its detected output is fed to the reset input terminal of the flip-flop circuit 31 via the inverter 32 and, also, is input to one of the inverting input terminals of the AND circuits 33 and 34, respectively. The output from the AND circuit 33 is fed to the self-latching relay 36, so that the relay contacts 36a and 36b are closed and the motor 38 is driven. As a result, the card 10 is fed toward the detecting levers 11 and 12 while being supported horizontally by the driving rollers 3 and 5 and their corresponding follower rollers 4 and 6.

In this case, when no deformation of the card is detected by the detecting levers 11 and 12, the card is fed to the magnetic head 24 by the driving and follower rollers 21 and 22, and the information data recorded on the card is read by the magnetic reading head 24.

When the card is deformed, either one of the detecting levers 11 or 12, or both levers, are pushed by the card and the corresponding contacts 17a and 18b are actuated. As a result, the detecting signal from either of the microswitches 17 or 18, or the detecting signals of both microswitches, are supplied to the set terminal of the flip-flop circuit 31 via the OR circuit 30. At this time, the card is located between the light source 7 and the light receiving element 8 so that a detecting signal from the element 8 is present. Therefore, the output signal from the Q terminal of the flip-flop circuit 31 is supplied to the AND circuit 34. The output signal from the AND circuit 34 is then fed to the relay circuit 35. When the output signal is supplied from the AND circuit 34 to the relay 37, the relay contacts 36a and 36b are opened while the relay contacts 37a and 37b are closed, causing the motor 38 to be driven in a reverse direction and causing the card to be fed back to the insertion aperture 2.

In the above-mentioned embodiment of the present invention, an example of the invention being applied to a cash dispenser has been explained. However, the invention can be satisfactorily applied to a device for controlling the opening and closing of a door and, also, to a punched card instead of a magnetic card. Further, an inscribing magnetic head may be provided, rather than the reading magnetic head, or a displaceable type magnetic head may be employed.

As will be apparent from the above explanation, the card handling device according to the present invention is constructed in such a manner that the deformed card is fed back to the card inserting aperture upon being detected. Consequently, it is possible to correctly read the information data inscribed on the card and, also, it is possible to eliminate the stopping of the operation of the device due to the card being caught in the device.

What is claimed is:

1. An information bearing card handling device comprising in combination:

means providing an aperture for inserting an information bearing card therethrough;
a card reader for reading said information on said inserted card;
means for transporting said inserted card from said aperture toward said reader;
means provided between said aperture and said reader for detecting deformations in said inserted card beyond a predetermined limit and effecting automatic rejection of said inserted card by generating an output signal when said deformations are detected; and
means responsive to said output signal for automatically controlling said transporting means so as to transport said deformed card back through said aperture.

2. A card handling device as in claim 1, wherein said detecting means comprises levers extending from opposing predetermined pivot points towards a path defined by the transporting means as it transports an inserted card from said aperture towards said reader, wherein the respective ends of said levers remote from said pivot points are separated by a distance corresponding to said predetermined limit of deformation so that at least one of said levers is contacted and pivoted by said deformed card as it is transported from said aperture.

3. A card handling device as in claim 2, wherein said detecting means further includes microswitches respectively corresponding to said levers, positioned so as to be actuated by said levers when contacted and pivoted by said deformed card and an OR gate connected to be responsive to said actuated microswitches to provide said output signal when at least one of said levers is contacted and pivoted.

4. A card handling device as in claim 2, wherein said information bearing cards are embossed and present a raised surface area of said card and wherein said levers are formed so as to pass said raised surface area without contacting said lever when said card is not deformed beyond a predetermined limit.

5. A card handling device as in claim 1, which further includes means for sensing the insertion of said card through said aperture and enabling said transport means to transport said inserted card from said aperture toward said reader.

6. A card handling device as in claim 5, wherein said sensing means comprises a light source and a light sensing element wherein said light source radiates light across a path defined between said aperture and said transporting means so that said inserted card will interrupt said radiated light and said light sensing element will accordingly, generate an enabling signal.

7. In an information card handling device, including means providing an aperture for inserting an information bearing card into said device, means for transporting said inserted card from said aperture along a predetermined path, means located along said path for reading said information on said transported card, an improvement comprising:

means adjacent said path between said aperture and said reading means for detecting an inserted card which is bent beyond a predetermined limit and effecting automatic rejection of said bent card by generating an output signal; and
means responsive to said output signal for controlling said transporting means to reverse the direction of said transported card back through said aperture thereby preventing said bent card from being read by said reading means.

8. In an information card handling device as in claim 7, wherein said transporting means include a reversible drive motor and drive rollers connected to said drive motor for contacting said inserted card and transporting the same along said predetermined path in a first direction towards said reading means, and further wherein said control means, upon responding to said output signal, reversing the direction of said drive motor causing said transported card to be transported in a second direction opposite to said first direction.

* * * * *